US011958117B2

(12) United States Patent
Henger

(10) Patent No.: US 11,958,117 B2
(45) Date of Patent: Apr. 16, 2024

(54) CUTTING INSERT AND TOOL FOR MACHINING A WORKPIECE

(71) Applicant: Hartmetall-Werkzeugfabrik Paul Horn GmbH, Tuebingen (DE)

(72) Inventor: Anna Henger, Oberboihingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 534 days.

(21) Appl. No.: 17/318,033

(22) Filed: May 12, 2021

(65) Prior Publication Data

US 2021/0260668 A1    Aug. 26, 2021

Related U.S. Application Data

(63) Continuation of application No. PCT/EP2019/083584, filed on Dec. 4, 2019.

(30) Foreign Application Priority Data

Dec. 4, 2018   (DE) ...................... 10 2018 130 788.8

(51) Int. Cl.
  *B23B 27/22*   (2006.01)
  *B23B 27/04*   (2006.01)
  *B23B 27/16*   (2006.01)

(52) U.S. Cl.
  CPC ........ *B23B 27/045* (2013.01); *B23B 2200/08* (2013.01); *B23B 2200/087* (2013.01);
  (Continued)

(58) Field of Classification Search
  CPC .............. B23B 27/045; B23B 2200/08; B23B 2200/32; B23B 2200/081;
  (Continued)

(56) References Cited

U.S. PATENT DOCUMENTS 4,969,779 A  *  11/1990  Barten .................. B23B 27/045
                                                 407/115
5,137,396 A  *  8/1992  Durschinger ......... B23B 27/045
                                                 407/116
(Continued)

FOREIGN PATENT DOCUMENTS

DE    102011016148 A1    10/2012
DE    102017103520 A1    8/2018
(Continued)

OTHER PUBLICATIONS

International Preliminary Report on Patentability for International Application No. PCT/EP2019/03584, dated Jul. 17, 2021.
(Continued)

*Primary Examiner* — Sara Addisu
(74) *Attorney, Agent, or Firm* — Jason H. Vick; Sheridan Ross, PC

(57) ABSTRACT

A cutting insert for a tool for machining a workpiece. The cutting insert comprises a rake face with a chip shaping geometry which is particularly suitable for machining titanium and titanium alloys. The chip shaping geometry is designed in such a way that the chip lifted from the workpiece is deformed comparatively strongly about its longitudinal axis. The chip shaping geometry is arranged at least in a rear area of the rake face, which is laterally bounded by a first concavely curved portion and a second concavely curved portion of the minor cutting edges of the cutting insert. The chip shaping geometry projects upwardly beyond a cutting plane in which the main cutting edge of the cutting insert and two rectilinear portions of the two minor cutting edges are arranged and comprises at least two elevations so that the rake face in the rear area in a further cross-section parallel to the main cutting edge comprises two high points and an intermediate second low point which has an equal third distance from the first concavely curved portion and (Continued)

the second concavely curved portion. A rake angle along the main cutting edge varies such that the rake angle γ1 at a center of the main cutting edge, which has an equal second distance from a first end and a second end of the main cutting edge, is greater than the rake angle in the area of the first and/or second ends.

16 Claims, 6 Drawing Sheets

(52) U.S. Cl.
CPC ....... *B23B 2200/28* (2013.01); *B23B 2200/32* (2013.01); *B23B 2220/12* (2013.01)

(58) Field of Classification Search
CPC ........ B23B 2200/083; B23B 2200/321; B23B 2200/323; B23B 2220/12; B23B 29/043; B23B 27/04; B23B 27/141; B23B 2200/0423; B23B 2200/087
See application file for complete search history.

(56) References Cited

U.S. PATENT DOCUMENTS

| | | | | |
|---|---|---|---|---|
| 5,511,911 A | * | 4/1996 | Katbi | .................... B23B 27/045 |
| | | | | 407/116 |
| 5,676,495 A | * | 10/1997 | Katbi | .................... B23B 27/045 |
| | | | | 407/115 |
| 8,366,355 B2 | * | 2/2013 | Nagaya | .................... B23B 27/04 |
| | | | | 407/115 |
| 9,205,495 B2 | | 12/2015 | Fujii et al. | |
| 2014/0030033 A1 | | 1/2014 | Luik et al. | |
| 2016/0207115 A1 | | 7/2016 | Ikenaga et al. | |
| 2017/0266732 A1 | * | 9/2017 | Andoh | .................. B23B 27/143 |
| 2017/0312828 A1 | * | 11/2017 | Jarvstrom | ................. B24B 3/34 |
| 2021/0001407 A1 | * | 1/2021 | Jarvstrom | ............. B23B 27/045 |

FOREIGN PATENT DOCUMENTS

| | | | | |
|---|---|---|---|---|
| EP | 2495058 A1 | | 9/2012 | |
| EP | 2878403 A1 | | 6/2015 | |
| EP | 3045242 A1 | | 7/2016 | |
| EP | 3231542 A1 | * 10/2017 | ............ B23B 27/04 |
| JP | H 08-132302 A | | 5/1996 | |
| JP | 2005-517543 A | | 6/2005 | |
| JP | 2010099816 A | * | 5/2010 | |
| JP | 2015-051485 A | | 3/2015 | |
| WO | WO 03/070419 A1 | | 8/2003 | |
| WO | WO 2012/117791 A1 | | 9/2012 | |

OTHER PUBLICATIONS

Translation of Notification of Reasons for Rejection for corresponding Japanese Patent Application No. 2021-527036, dated Dec. 14, 2021.
International Search Report for International Application No. PCT/EP2019/083584, dated Feb. 28, 2020.
Written Opinion for International Application No. PCT/EP2019/083584, dated Feb. 28, 2020.

* cited by examiner

US 11,958,117 B2

CUTTING INSERT AND TOOL FOR MACHINING A WORKPIECE

CROSS-REFERENCE TO RELATED APPLICATIONS

This application is a continuation of international patent application PCT/EP2019/083584, filed on Dec. 4, 2019 designating the U.S., which international patent application has been published in German language and claims priority from German patent application DE 10 2018 130 788.8, filed on Dec. 4, 2018. The entire contents of these priority applications are incorporated herein by reference.

BACKGROUND

This disclosure relates to a cutting insert for a tool for machining a workpiece. Furthermore, this disclosure relates to a tool with a tool holder and a cutting insert arranged on the tool holder.

This disclosure relates particularly to a cutting insert for a tool for grooving and parting-off turning. The cutting insert may be particularly designed for grooving and parting-off turning of titanium.

A large number of tools for grooving and parting-off turning are already known. An exemplary tool for grooving and parting-off turning is shown in DE 10 2011 016 148 A1.

Especially for grooving, it is necessary that the lifted chip is narrower than the groove width to be created. Otherwise, the lifted chip collides laterally with the groove flanks and damages the workpiece surface. The chip should therefore be actively shaped or curved not only about its transverse axis, but also about its longitudinal axis.

The grooving and parting-off turning of titanium and titanium alloys is particularly challenging due to the properties of these materials. Among other things, titanium and titanium alloys have a very high ductility. A chip lifted off during turning therefore bounces comparatively strongly. To compensate for this, the chip should be deformed around its longitudinal axis to a comparatively greater extent during grooving and parting-off turning of titanium and titanium alloys than is necessary when machining other materials.

A higher degree of forming of the lifted chip results in faster chip breaking, which is basically advantageous. At the same time, however, this also leads to a higher load on the cutting area or the entire cutting insert. This has a negative effect on wear and thus on the service life of the cutting insert.

Furthermore, titanium has a very low thermal conductivity, which leads to a high heat input in the cutting edge. Normally, the heat is also partially dissipated by heat conduction via the workpiece itself, but with low thermal conductivity the energy remains in the area of the cutting point and thus in the tool and chip. The lifted chip should therefore be removed comparatively quickly, i.e. transported away from the cutting edge.

SUMMARY

It is an object to provide a cutting insert which is particularly suitable for grooving and parting-off turning of titanium and titanium alloys and by means of which the above-mentioned technical boundary conditions can be complied with. In particular, it is an object to find a balance between the required chip forming and the associated cutting edge load.

According to a first aspect, a cutting insert is provided, which comprises:

a main cutting edge which is configured rectilinear and extends between a first end and an opposite second end;

a first minor cutting edge which comprises a first rectilinear portion and a first concavely curved portion, wherein the first rectilinear portion is connected to the first end of the main cutting edge directly or via a radius or chamfer;

a second minor cutting edge which comprises a second rectilinear portion and a second concavely curved portion, wherein the second rectilinear portion is connected to the second end of the main cutting edge directly or via a radius or chamfer; and a rake face which comprises a chip shaping geometry;

wherein the main cutting edge, the first rectilinear portion and the second rectilinear portion are arranged in a common cutting plane, wherein the main cutting edge forms an acute angle with the first rectilinear portion of the first minor cutting edge and the second rectilinear portion of the second minor cutting edge, respectively, wherein the rake face is recessed downwardly with respect to the cutting plane in a front area which is laterally bounded by the first rectilinear portion of the first minor cutting edge and the second rectilinear portion of the second minor cutting edge, and comprises a low point in each cross-section parallel to the main cutting edge, which low point has an equal first distance from the first rectilinear portion and the second rectilinear portion and has a maximum distance from the cutting plane compared to all other points on the rake face in the respective cross-section, wherein the chip shaping geometry is arranged at least in a rear area of the rake face, which is laterally bounded by the first concavely curved portion and the second concavely curved portion, and projects upwardly beyond the cutting plane and comprises at least two elevations so that the rake face in the rear area in a further cross-section parallel to the main cutting edge comprises two high points and an intermediate second low point which has an equal third distance from the first concavely curved portion and the second concavely curved portion, and wherein a rake angle varies along the main cutting edge such that the rake angle $\gamma 1$ at a center of the main cutting edge, which has an equal second distance from the first end and the second end of the main cutting edge, is greater than the rake angle $\gamma 2$ in the area of the first and/or second end.

According to a second aspect, a tool is provided which comprises a tool holder and a cutting insert, wherein the cutting insert comprises:

a main cutting edge which is rectilinear and extends between a first end and an opposite second end;

a first minor cutting edge which comprises a first rectilinear portion and a first concavely curved portion, wherein the first rectilinear portion is connected to the first end of the main cutting edge directly or via a radius or chamfer;

a second minor cutting edge which comprises a second rectilinear portion and a second concavely curved portion, wherein the second rectilinear portion is connected to the second end of the main cutting edge directly or via a radius or chamfer; and a rake face which comprises a chip shaping geometry;

wherein the main cutting edge, the first rectilinear portion and the second rectilinear portion are arranged in a common cutting plane, wherein the main cutting edge forms an acute angle with the first rectilinear portion and the second rectilinear portion, respectively, wherein the rake face is recessed downwardly with respect to the cutting plane in a front area of the rake face which is laterally bounded by the first rectilinear portion and the second rectilinear portion, and comprises a low point in each cross-section parallel to the main cutting edge, which low point has an equal first distance from the first rectilinear portion and the second rectilinear portion and has a maximum distance from the cutting plane compared to all other points on the rake face in the respective cross-section, wherein the chip shaping geometry is arranged at least in a rear area of the rake face, which is laterally bounded by the first concavely curved portion and the second concavely curved portion, and projects upwardly beyond the cutting plane and comprises at least two elevations so that the rake face in the rear area in a further cross-section parallel to the main cutting edge comprises two high points and an intermediate second low point which has an equal third distance from the first concavely curved portion and the second concavely curved portion, and wherein a rake angle varies along the main cutting edge such that a first rake angle at a center of the main cutting edge, which has an equal second distance from the first end and the second end of the main cutting edge, is greater than a second rake angle on a point of the main cutting edge that is closer to the first end or the second end than the center of the main cutting edge.

The rectilinear (non-curved) main cutting edge of the cutting insert is connected at each of its two ends directly, via a radius and/or via a chamfer, to a respective minor cutting edge. Each of the two minor cutting edges (referred to herein as "first and second minor cutting edges") has a rectilinear (non-curved) portion and a concavely curved portion. Depending on the embodiment, the concavely curved portion may be directly adjacent to the rectilinear portion of the respective cutting edge. Alternatively, between the rectilinear portion and the concavely curved portion of the respective cutting edge, a further form element can also be provided as a transition or connecting piece.

The rectilinear main cutting edge can be used, for example, to create a flat groove base during grooving. The workpiece can also be machined by means of the two minor cutting edges.

The rectilinear portions of the two minor cutting edges may be arranged in a common plane with the main cutting edge. This plane is referred to herein as the "cutting plane". The arrangement of the rectilinear portions of the minor cutting edges in a common plane with the main cutting edge enables not only grooving but also longitudinal turning machining. For example, the workpiece can be chamfered by means of the rectilinear portions of the minor cutting edges.

Insofar as the two minor cutting edges are each connected to the main cutting edge via a radius and/or chamfer, these radii and/or chamfers may also be arranged in the said cutting plane.

Between the rectilinear portions of the minor cutting edges and the main cutting edge, there is in each case an acute angle α which can be measured within the cutting plane. This angle may be 70°<α<90°, and preferably 80°<α<90°. This lateral clearance angle prevents undesirable contact or collision of the minor cutting edges with the groove flanks during groove turning.

The rake face of the cutting insert can basically be divided into two sub-areas. These two sub-areas are referred to as the "front area" and the "rear area", since the front area is at a shorter distance from the main cutting edge than the rear area. In particular, the area of the rake face that is laterally bounded by the rectilinear portions of the two minor cutting edges is referred to as the front area. This front area of the rake face may be directly adjacent to the main cutting edge. The rear area is defined as the area of the rake face that is laterally bounded by the two concavely curved portions of the minor cutting edges.

In the front area, the rake face is recessed downwardly with respect to the cutting plane. Here, the rake face forms a kind of trough, which can also be generally referred to as a recess. In any cross-section parallel to the main cutting edge, the rake face in this front area has a low point which has a comparatively maximum distance from the cutting plane. This low point may be centrally located. Thus, the low point has an equal distance from the first rectilinear portion and the second rectilinear portion in each of the cross-sections. It should be noted, however, that in addition to this centrally arranged low point, there may also be other low points in the front area of the rake face. Only one low point per cross-section (cross-section parallel to the main cutting edge) may be provided here. In principle, however, the rake face could also be approximately U-shaped, so that the mentioned low point would not be a single point but a centrally arranged straight line within the respective cross-section.

The rake face comprises a chip shaping geometry that projects upwardly beyond the cutting plane in the rear area. The chip shaping geometry is designed as a raised structure in the rear area. It forms a relative elevation.

The chip shaping geometry may ensure faster rolling in of the chip transverse to the longitudinal chip axis in order to break it more quickly. At the same time, the chip shaping geometry may be designed to curl the chip laterally, i.e. along the longitudinal chip axis, in order to reduce the chip width and avoid collisions with the groove flanks produced on the workpiece. Lateral chip shaping preferably takes place in the areas directly after the main cutting edge (i.e. in the front area), where the material behaves at least partially plastically. At the latest 0.5 mm after the cutting edge, lateral forming is typically largely complete. The chip shaping geometry also repels the generated chip roll from any clamping elements of the cutting insert.

The cross-section (parallel to the main cutting edge) in the rear area of the rake face is referred to herein as the "further cross-section". This serves only to differentiate it from the parallel cross-section in the front area of the rake face.

Preferably, the chip shaping geometry has two high points and one intermediate low point (referred to as "second low point") in the rear area of the chip face in each (further) cross-section parallel to the main cutting edge. This results in a kind of wave shape in the (further) cross-section. Due to this shape, the chip is guided laterally in the recess which results between the two high points and the second low point, wherein the chip width of the chip, which has already been laterally rolled in the front area of the rake face, is maintained or even further reduced.

The recess created between the two high points in the rear area of the rake face thus guides the chip roller laterally. This leads to optimum chip formation, especially when machining titanium and titanium alloys.

Another feature of the cutting insert is that the rake angle varies along the main cutting edge. Thus, different rake angles occur at different points of the main cutting edge. This rake angle is measured at each point of the main cutting edge, as usual, between the cutting plane and the rake face. The rake angle is therefore the angle at which the rake face slopes down from the main cutting edge relative to the cutting plane. It is understood that a corresponding rake angle can also occur at the minor cutting edges of the cutting insert.

The rake angle along the main cutting edge may vary in such a way that the rake angle γ1 in the center of the main cutting edge (equal distance to both ends of the main cutting edge) is larger than the rake angle γ2 in the area of the two ends. The rake angle γ therefore decreases along the main cutting edge from the inside to the outside.

A comparatively low rake angle at both ends of the main cutting edge, i.e. in the cutting edge corners, stabilizes the cutting edge corners, which are typically among the areas of a cutting insert used for grooving that are subjected to the highest loads. Conversely, a comparatively large rake angle in the center of the main cutting edge has the advantage that it allows the chip to be shaped in such a way that it tapers in its width (chip width).

The above-mentioned object is thus completely solved.

According to a refinement, the rake angle varies along the main cutting edge such that the rake angle decreases monotonically from the center of the main cutting edge toward each of the first end and toward the second end.

The rake angle can also decrease in a strictly monotonous manner along the main cutting edge, starting from the center towards both ends of the main cutting edge. However, this need not necessarily be the case. Preferably, the decrease of the rake angle starting from the center towards both ends is symmetrical with respect to the center of the main cutting edge. The rake angle thus decreases from the center of the main cutting edge towards the first end in the same way as it decreases from the center of the main cutting edge towards the second end. This ensures a desired symmetrical taper of the chip in its chip width.

According to a further refinement, the following further applies for the rake angle:

$$5° \leq \gamma 2 \leq \gamma 1 \leq 30°$$

These limits result particularly from the fact that at a rake angle γ>30° the main cutting edge would become too unstable. Conversely, a rake angle γ<5° would result in a comparatively blunt cutting edge. The rake angle γ2 should therefore not be smaller than 5° in the area of the two ends of the main cutting edge. At the center of the main cutting edge, the rake angle γ1 should also not be greater than 30°.

According to a further refinement, the following further applies: $0.8 \geq \gamma 2/\gamma 1 \geq 0.16$.

Thus, the size of the rake angle γ2 at the two outer ends of the main cutting edge is in the range of 16%-80% of the size of the rake angle γ1 at the center of the main cutting edge.

According to a further refinement, a minor cutting edge rake angle along the first minor cutting edge varies such that the minor cutting edge rake angle along the first minor cutting edge decreases monotonically with increasing distance from the main cutting edge.

This monotonic decrease preferably applies to both the first rectilinear portion and the first concavely curved portion of the first minor cutting edge. The corresponding restriction regarding the monotonic decrease of the minor cutting edge rake angle preferably also applies correspondingly to the second minor cutting edge (Thus: The minor cutting edge rake angle preferably varies along the second minor cutting edge in such a way that the minor cutting edge rake angle monotonically decreases along the second minor cutting edge with increasing distance from the main cutting edge).

By varying the rake angle along the two minor cutting edges in this way, chip formation and chip shaping can in turn be controlled advantageously accordingly. The defined minor cutting edge rake angle along the minor cutting edges also provides at the minor cutting edges a defined cutting wedge, which enables machining with the minor cutting edges as well.

According to a further refinement, the minor cutting edge rake angle is constant along the first rectilinear portion of the first minor cutting edge. Likewise, in this refinement, the minor cutting edge rake angle is constant along the second rectilinear portion of the second minor cutting edge.

In this refinement, the minor cutting edge rake angle preferably decreases only along the first or second concavely curved portion of the first or second minor cutting edge. This is particularly advantageous for smaller grooving widths, i.e. shorter main cutting edges, since the rake face is then not too strongly curved in its front area. Otherwise, this could also lead to a comparatively high load on the rake face.

According to a further refinement, the rake face is configured as a continuous free-form surface.

This has the advantage that the chip can run over the rake face without interference. The chip does not collide with discontinuous elevations or recesses, but is gently deflected. This reduces the load on the cutting insert.

The rake face may, for example, be a bicubic face which is cubically interpolated in both the longitudinal and transverse directions. In such a case, the rake angle can, for example, vary along the main cutting edge with a quadratic interpolation, wherein the rake angle, as already mentioned, decreases quadratically from the center of the main cutting edge outward to its two ends.

In principle, the rake face formed as a free-form surface can be formed by an interpolation of higher than just square order.

According to a further refinement, the rake face is mirror symmetrical to a mirror plane passing through the center of the main cutting edge and oriented orthogonally to the main cutting edge.

This results in a symmetrical deformation of the chip, which enables comparatively advantageous chip removal.

According to a further refinement, the rake face is directly adjacent to the main cutting edge, the first minor cutting edge, and the second minor cutting edge.

This allows maximum utilization of the rake face in both longitudinal and transverse directions. However, a transition surface can also be arranged between the rake face and the respective cutting edges (main cutting edge, first and second minor cutting edge) so that the rake face does not necessarily have to be directly adjacent to the respective cutting edges.

According to a further refinement, the rake face projects upwardly throughout the rear area with respect to the cutting plane.

In other words, from the transition from the rectilinear portions of the minor cutting edges to the concavely curved portions of the minor cutting edges, the rake face has a raised structure that projects upwardly relative to the cutting plane. This leads to a comparatively fast fracture of the chip, so that an undesirably long chip formation is effectively avoided.

Preferably, the chip shaping geometry of the rake face protrudes to a height h above the cutting plane and the main cutting edge has a length l, where:

$$0.6*l \geq h \geq 0.1*l.$$

The height h of the chip shaping geometry is thus preferably selected as a function of the length l of the main cutting edge. Particularly preferably applies:

$$0.3*l \geq h \geq 0.2*l.$$

According to a further refinement, the rake face is concave in any longitudinal section orthogonal to the main cutting edge (i.e., in all longitudinal sections orthogonal to the main cutting edge).

The curvature of the rake face can vary depending on the longitudinal section. In principle, the rake face is concave in each of the parallel longitudinal sections, which are orthogonal to the main cutting edge. Thus, the entire depth or length of the rake face is utilized. If the rake face was not concavely curved in each longitudinal section, the chip would otherwise not contact the rear areas at all in some areas of the rake face.

According to another refinement; the first concavely curved portion is equal to or longer than the first rectilinear portion, and the second concavely curved portion is equal to or longer than the second rectilinear portion.

The said rear area of the rake face, in which the chip shaping geometry is arranged; is thus preferably configured to be larder than the front area of the rake face. Even with the above-mentioned height ratios of the chip shaping geometry, it is therefore not necessary for the two concavely curved portions of the minor cutting edges and the rear area of the rake face to be excessively curved. This makes it possible to achieve relatively gentle and uniform chip shaping.

It is understood that the above features and those yet to be explained may be used not only in the combination indicated in each case, but also in other combinations or on their own without leaving the spirit and scope of the present disclosure.

DESCRIPTION OF PREFERRED EMBODIMENTS

Figure 1:
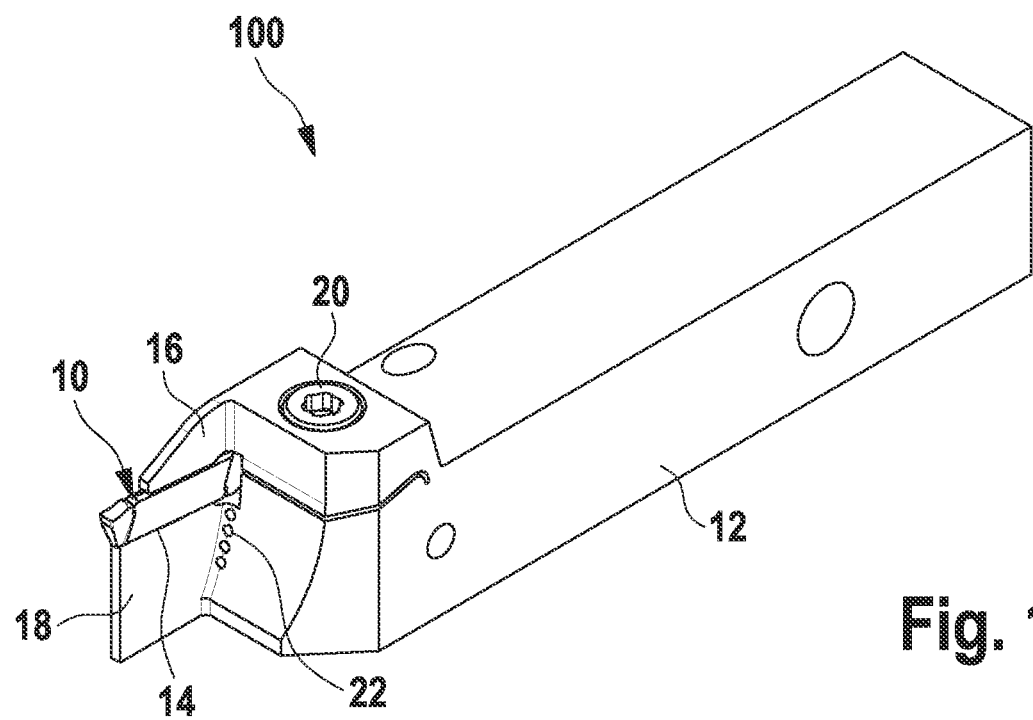
FIG. 1 a perspective view of a tool according to an embodiment.

FIG. 1 shows a perspective view of an embodiment of the herein presented tool. The tool is denoted therein in its entirety with the reference numeral 100.

The tool 100 is configured as a turning tool. It is particularly suitable for grooving and parting-off turning. The tool 100 comprises a cutting insert 10 and a tool holder 12. In this case, the cutting insert 10 can be detachably attached to the tool holder 12. Thereto, the tool holder 12 comprises a cutting insert receptacle 14 for receiving the cutting insert 10.

In this embodiment, the cutting insert receptacle 14 is defined by an upper clamping jaw 16 and an opposing lower clamping jaw 18. The cutting insert 10 can be clamped between the upper clamping jaw 16 and the lower clamping jaw 18.

In the present embodiment, the tool holder 12 further comprises a fastening element 20, which is configured as a screw. The screw 20 engages a corresponding thread in the holder 12. By tightening the screw 20, the upper clamping jaw 16 can be moved towards the lower clamping jaw 18, thereby fixing the cutting insert 10 in the cutting insert receptacle 14.

According to the embodiment shown in FIG. 1, several coolant outlets 22 are also visible in the area of the cutting insert receptacle 14. Through these coolant outlets 22, coolant and lubricant, which is guided through corresponding channels in the interior of the tool holder 12, reaches the area of the machining point of the workpiece.

It should be noted that the embodiment shown in FIG. 1 is only one of a plurality of possible embodiments. In particular, the design and shape of the tool holder 12 can be freely varied. Instead of a beam-shaped tool holder 12 as shown in FIG. 1, the tool holder can in principle also be designed in the form of a parting blade, for example of the type shown in DE 10 2017 103 520 A1. Various other embodiments of the tool holder 12 are conceivable. The type of clamping of the cutting insert 10 shown here can also be implemented in a fundamentally different way without leaving the spirit and scope of the present disclosure. For example, a screw 20 does not necessarily need to be used as a fastening element. In principle, other clamping elements for clamping the cutting insert 10 to the tool holder 12 are also conceivable. Likewise, it would be conceivable to configure the upper and lower clamping jaws 16, 18 as self-clamping, so that an extra clamping element can be dispensed with entirely. The coolant outlets 22 are advantageous, but likewise need not necessarily be present. Alternatively, the coolant outlets can also emerge from the tool holder 12 at other locations. All of these variations/modifications are possible without leaving the spirit and scope of the present disclosure.

Figure 2:
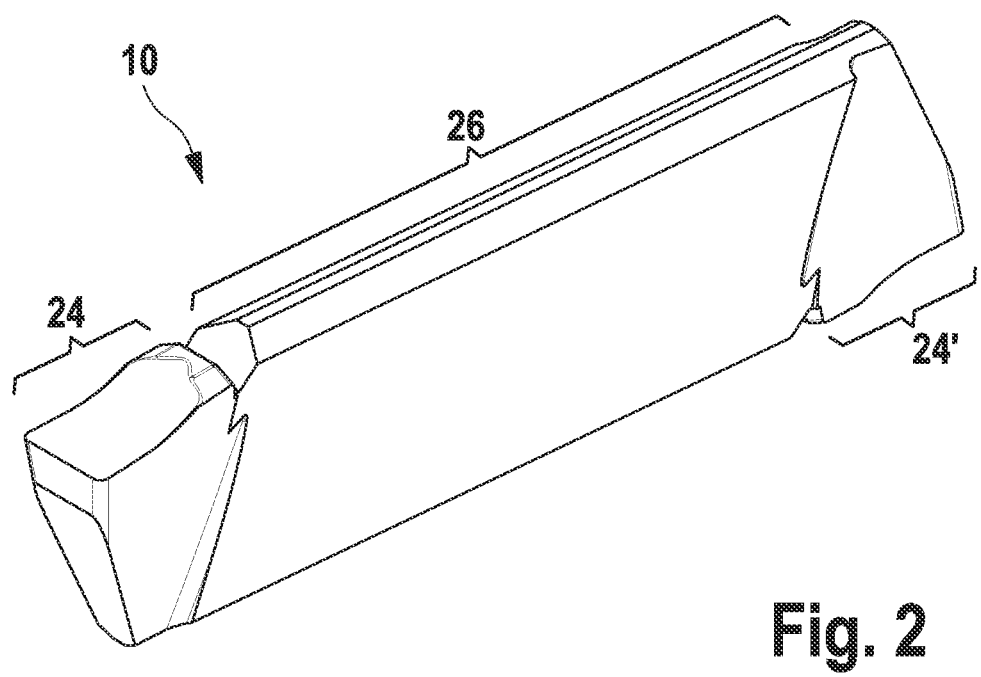
FIG. 2 a perspective view of a cutting insert according to an embodiment.

FIG. 2 shows an embodiment of the cutting insert 10 in a perspective view. The cutting insert 10 is configured as an indexable insert and thus comprises two identically designed cutting blade areas 24, 24'. The cutting insert 10 can therefore be used twice. As soon as the cutting blade area 24 is worn, the cutting insert 10 can be detached from the tool holder 12, turned by 180° and then fixed to the tool holder 12 again so that the second cutting blade area 24' can then be inserted.

However, the cutting insert 10 does not have to be configured so symmetrically as an indexable insert. In principle, it is also sufficient to provide only one of the two cutting blade areas 24, 24'. Conversely, the provision of more than two cutting blade areas is also possible, for example in the case of three- or multi-blade inserts. Between the two cutting blade areas 24, 24', the cutting insert 10 comprises a clamping portion 26 in the present embodiment. This clamping portion 26 is usually preferably prismatic in cross-section. It serves to clamp the cutting insert 10 in the cutting insert receptacle 14. For this purpose, the clamping portion 26 usually comprises a plurality of abutment surfaces that abut corresponding abutment surfaces provided in the cutting insert receptacle 14 of the tool holder 12.

FIGS. 3-7 show the cutting blade area 24 of the cutting insert 10 in detail in different views (perspective, from the side, from above and from the front). As can be seen from therefrom, the cutting insert 10 comprises a main cutting edge 28 and two minor cutting edges 30, 32 extending transversely thereto. The minor cutting edges 30, 32 are referred to as the first minor cutting edge 30 and the second minor cutting edge 32 for better differentiation.

A first end 34 of the main cutting edge 28 is connected to the first minor cutting edge 30 via a first radius 38. An opposite second end 36 of the main cutting edge 28 is connected to the second minor cutting edge 32 via a second radius 40. Instead of the radii 38, 40, chamfers or combinations of chamfers and radii would also be conceivable in principle as connecting pieces between the main cutting edge 28 and the minor cutting edges 30, 32. In principle, the minor cutting edges 30, 32 could also be connected directly to the main cutting edge 28, so that sharp corners would then actually be created in the corners of the cutting insert or the cutting blade area 24.

The main cutting edge 28 is preferably configured as a rectilinear or uncurved cutting edge. The two minor cutting edges 30, 32, on the other hand, are at least partially curved. Both minor cutting edges 30, 32 each comprise a rectilinear portion 42, 44 and a concavely curved portion 46, 48. The rectilinear portion 42 of the first minor cutting edge 30 is herein referred to as the first rectilinear portion 42. The rectilinear portion 44 of the second minor cutting edge 32 is herein referred to as the second rectilinear portion 44. The first concavely curved portion 46 of the first minor cutting edge 30 is herein referred to as the first concavely curved portion 46. The concavely curved portion 48 of the second minor cutting edge 32 is herein referred to as the second concavely curved portion 48.

The two rectilinear portions 42, 44 each form the front portion of the respective minor cutting edge 30, 32. The rectilinear portions 42, 44 are connected to the main cutting edge 28 via the radii 38, 40, via corresponding chamfers or directly. The two curved portions 46, 48 each form the rear area of the respective minor cutting edge 32. The concavely curved portions 46, 48 preferably adjoin the respective rectilinear portions 42, 44 directly. In principle, other shaped elements could also be present as respective transitions between the rectilinear and curved portions 42, 46 or 44, 48 of the two minor cutting edges 30, 32. However, according to the preferred embodiment shown in FIG. 3, the rectilinear portions 42, 44 each merge directly and tangentially into the concavely curved portions 46, 48. As can be seen, for example, from FIGS. 4 and 6, the main cutting edge 28, the first rectilinear portion 42 and the second rectilinear portion 44 are arranged in a common cutting plane. This cutting plane 50 is drawn as a dashed line in FIGS. 4 and 6 and is marked with the reference numeral 50. The corner radii 38, 40 are preferably also arranged in this cutting plane 50. The radius of the two radii 38, 40 is preferably equal and amounts to a maximum of 50% of the width of the main cutting edge 28 (measured between the first and second end 34, 36) or 25% of the overall width l. In the case of chamfers instead of the radii 38, 40, these would also preferably be arranged in the cutting plane 50. Arranging the main cutting edge 28 in a common cutting plane 50 together with the first and second rectilinear portions 42, 44 has particularly the advantage that this also allows longitudinal turning using the minor cutting edges 30, 32.

Figure 5:
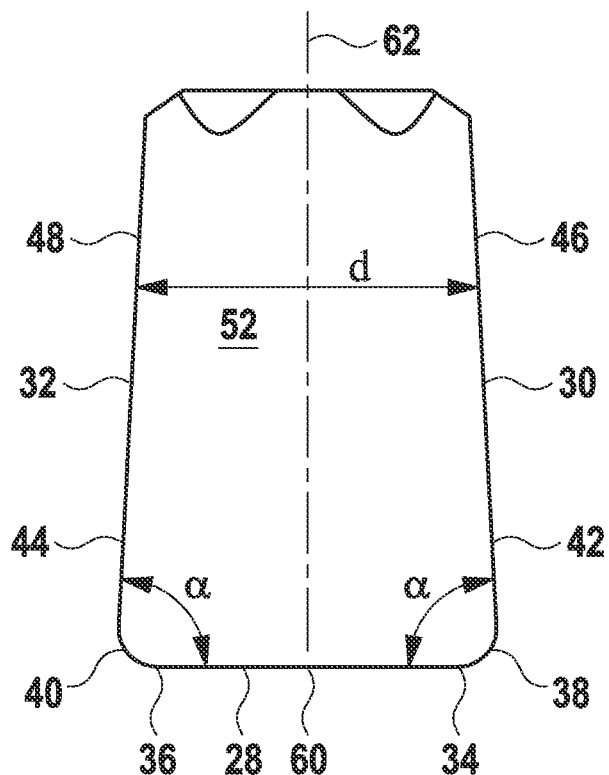
FIG. 5 a top view r above of the detail of the cutting insert shown in FIG. 3.

The minor cutting edges 30, 32, more specifically theft rectilinear portions 42, 44, preferably do not extend orthogonally but at an acute angle $\alpha$ (see FIG. 5) to the main cutting edge 28. The cutting or clearance angle $\alpha$ is preferably measured in the range of 70°-90°, preferably measured in the range of 80°-90°. In the herein shown embodiment, the angle $\alpha$ is measured at 87°. The acute angle $\alpha$ prevents undesirable contact of the minor cutting edges 30, 32 with the groove flanks formed on the workpiece during grooving, for example during grooving turning. Due to the acute angle $\alpha$, a minor cutting edge distance d between the first concavely curved portion 46 and the second concavely curved portion 48 becomes smaller with increasing distance from the main cutting edge 28. It should be noted that, unlike what is shown in FIG. 5, the two concavely curved portions 46, 48 do not need to be arranged in a common plane with the two rectilinear portions 42, 44. In other embodiments, the concavely curved portions 46, 48 may be, when viewed from above, tapered more inwardly toward the center (toward the dashed line 62) or curved.

On the upper side, the cutting insert 10 comprises a rake face 52 in its cutting blade area 24. The lifted chip flows over this rake face 52 during the use of the cutting insert 10. The rake face 52 serves for chip guidance and chip forming. Preferably, the rake face 52 is configured as a continuous free-form surface. In the present embodiment, the rake face 52 directly adjoins the main cutting edge 28 as well as the two minor cutting edges 30, 32. However, this does not necessarily need to be the case. Smaller transition surfaces can also be arranged between the rake face 52 and the respective cutting edges 28, 30, 32, which transition surfaces do not have to function directly as rake faces. However, in order to utilize the entire width and length of the cutting area 24, it is preferred that the rake face 52 directly adjoins the cutting edges 28, 30, 32.

The rake face 52 can be divided into a front area 54 and a rear area 56. Both areas 54, 56 preferably merge directly and continuously into one another. The front area 54 of the rake face 52 is laterally bounded by the two rectilinear portions 42. 44 of the minor cutting edges 30, 32. The rear area 56 of the rake face 52 is laterally bounded by the two concavely curved portions 46, 48 of the minor cutting edges 30, 32. Accordingly, the rear area 56 has a greater distance from the main cutting edge 28 than the front area 54, which is preferably directly adjacent to the main cutting edge 28.

Figure 3:
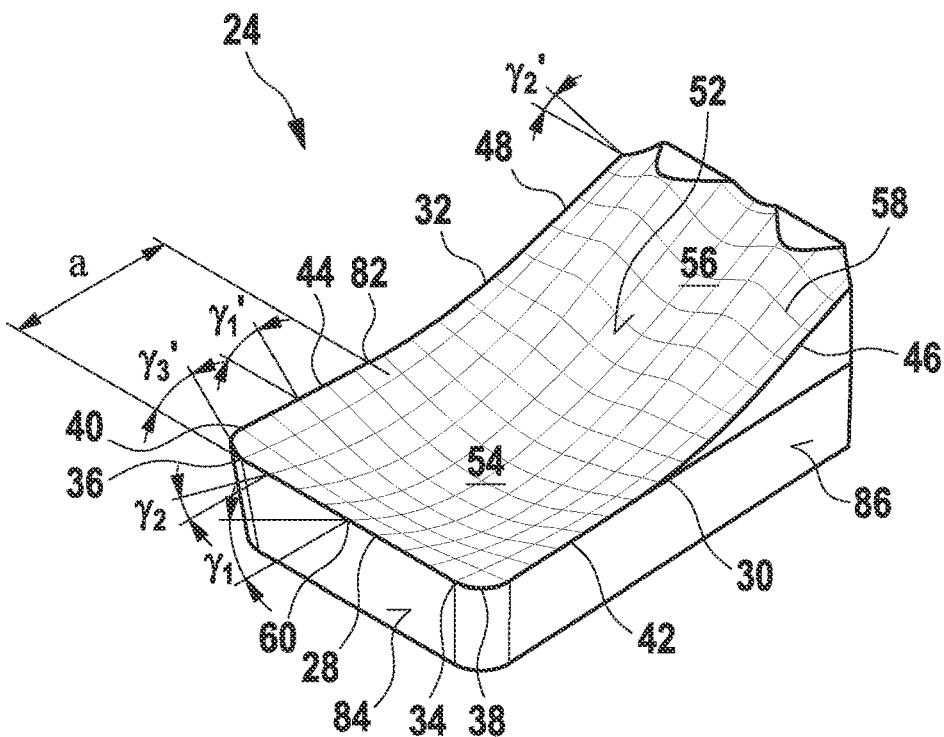
FIG. 3 a perspective view of a detail of the cutting insert shown in FIG. 2.

The complex shaped structure of the rake face 52 is graphically highlighted in FIG. 3 by means of several auxiliary lines 58. It is understood that these auxiliary lines 58 are in reality not present.

Figure 11:
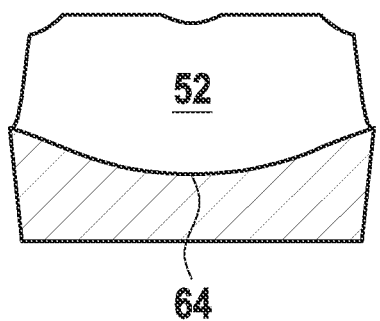
FIG. 11 a first cross-section through the detail of the cutting insert shown in FIG. 3.

In the front area 54, the rake face 52 is recessed downwardly with respect to the cutting plane 50. The rake face 52 forms a trough-shaped recess in the front area 54. This can be seen, for example, in FIG. 7. In the front area 54, the rake face 52 comprises a low point in each cross-section parallel to the main cutting edge 28 and equidistant from the first and second rectilinear portions 42, 44 of the first and second minor cutting edges 30, 32, respectively. An exemplary cross-section of this type (parallel to the main cutting edge 28) is shown in FIG. 11. The low point designated therein by reference numeral 64 is to be understood as an actual mathematical low point, which has the greatest distance from the cutting plane 50 compared to all other points on the rake face 52 in this cross-section.

Figure 12:
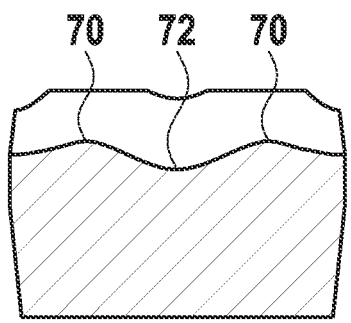
FIG. 12 a second cross-section through the detail of the cutting insert shown in FIG. 3.

In the rear area 56, the rake face 52 preferably has a raised structure that projects upwards above the cutting plane 50. In this rear area 56, the rake face 52 comprises a chip shaping geometry which comprises at least two elevations 66 and a recess 68 lying therebetween. This is again graphically highlighted in FIG. 7 using auxiliary lines. More specifically, in the rear area 56, in any cross-section parallel to the main cutting edge 28, the rake face 52 comprises two high points 70 and a low point 72 lying therebetween, wherein the low point 72, similar to the low point 64 in the front area 54, has an equal distance from the two minor cutting edges 30, 32. Such an exemplary cross-section of the rake face 52 through the rear area 56 thereof is shown in FIG. 12.

The elevations 66 guide the chip laterally. As can be seen in particular from FIGS. 3 and 7, the curvature of the elevations 66 increases with increasing distance from the main cutting edge 28 to improve this lateral guidance. The high points 70 are preferably spaced respectively from the concavely curved portions 46, 48 of the minor cutting edges 30, 32, so that the rear area 56 of the rake face 52 slopes laterally outwardly again, i.e. toward the concavely curved portions 46, 48, starting from the high points 70. This results in a kind of wave-like cross-section in each (further) cross-section (in the rear area 56).

Figure 9:
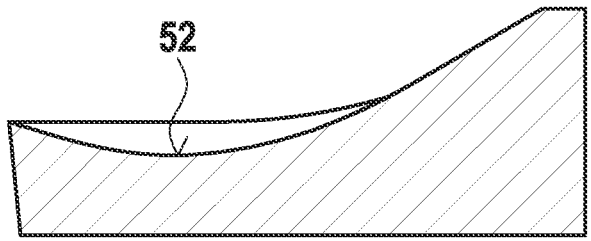
FIG. 9 a first longitudinal section through the detail of the cutting insert shown in FIG. 3.
Figure 10:
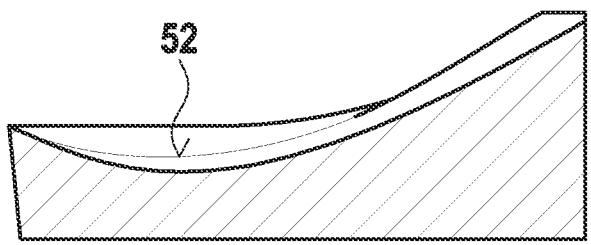
FIG. 10 a second longitudinal section through the detail of the cutting insert shown in FIG. 3.

In the longitudinal sections oriented orthogonally thereto (sections orthogonal to the main cutting edge 28), the rake face 52 is preferably concavely curved, both in the front area 54 and in the rear area 56. More precisely, the line of intersection of the rake face 52 resulting in these longitudinal sections is concavely curved in each of these longitudinal sections arranged parallel to each other. Two examples of these longitudinal sections are shown in FIGS. 9 and 10.

The rake face 52 is preferably mirror symmetrical to a mirror plane which passes through the center 60 of the main cutting edge 28 and is oriented orthogonally to the main cutting edge 28. This mirror plane is indicated in FIG. 5 as a dashed line and is provided with the reference numeral 62. The center 60 of the main cutting edge 28 is the point that is an equal distance from both the first end 34 and the second end 36 of the main cutting edge 28.

Another feature of the cutting insert 10 is the kind of configuration of the rake angle along the cutting edges 28, 30 and 32. The rake angle γ, which is formed between the rake face 52 and the cutting plane 50 along the cutting edges 28, 30, 32, respectively, preferably varies along the cutting edges 28, 30, 32.

A rake angle γ1 at the center 60 of the main cutting edge 28 is preferably larger than a rake angle γ2 in the area of the first and/or second end 34, 36 of the main cutting edge 28. Particularly preferably, the rake angle γ decreases monotonically along the main cutting edge 28 starting from the center 60 outwards, i.e. towards the two ends 34, 36. Particularly preferably, the rake angle along the main cutting edge 28 decreases strictly monotonically from the inside to the outside.

Figure 8:
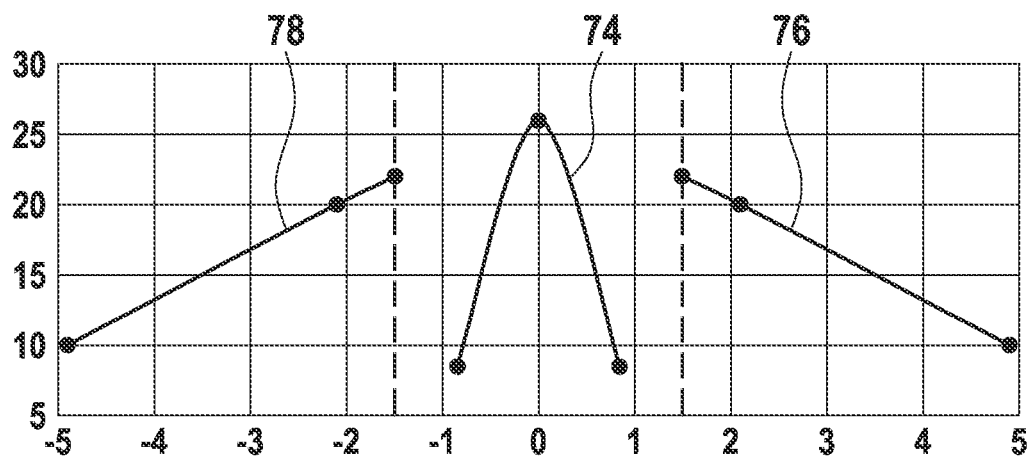
FIG. 8 a distribution of the rake angle or the minor cutting edge rake angle according to an embodiment.

In the present embodiment, the amount of the rake angle γ decreases quadratically in both directions starting from the center 60 of the main cutting edge 28. This can be seen, for example, from the diagram shown in FIG. 8, which shows the distribution of the rake angle size or the amount of the rake angle along the main and minor cutting edges 28, 30, 32. In FIG. 8, the horizontal x-axis indicates in each case the position with respect to the center 60 of the main cutting edge, with negative coordinates to the left of the center 60 and positive coordinates to the right of the center 60, respectively. The amount of the rake angle γ is in each case plotted on the vertical y-axis. Curve 74 indicates the rake angle distribution along the main cutting edge 28. Curves 76 and 78 correspondingly indicate the rake angle distribution along the minor cutting edges 30, 32. Accordingly, the rake angle also varies along the two minor cutting edges 30, 32, in such a way that the rake angle (referred to as the minor cutting edge rake angle γ′ along the minor cutting edges 30, 32) monotonically decreases along the respective minor cutting edges 30, 32 with increasing distance from the main cutting edge 28. In the example shown in FIG. 8, the minor cutting edge rake angle γ′ even decreases strictly monotonically and linearly.

It is understood, however, that the rake angle distribution along the cutting edges 28, 30, 32 shown in FIG. 8 is only one of various possibilities. For example, a minor cutting edge rake angle γ′1 may be constant along the entirety of the rectilinear portions 42, 44 and decrease only in the area of the curved portions 46, 48. As shown in FIG. 8, however, the minor cutting edge rake angle γ′ can also decrease in a strictly monotonic manner already along the rectilinear portions 42, 40 of the minor cutting edges 30, 32. In principle, however, it is preferred that a minor cutting edge rake angle γ′1 in the area of the rectilinear portions 42, 44 is greater than a minor cutting edge rake angle γ′2 in the area of the concavely curved portions 46, 48.

Furthermore, the following boundary conditions apply to the rake angle distribution along the main cutting edge 28:

$$5° \leq \gamma2 < \gamma1 \leq 30°$$

$$0.8 \geq \frac{\gamma2}{\gamma1} \geq 0.16.$$

A rake angle γ3 in the area of the radii 38, 40 is preferably greater than or equal to the minor cutting edge rake angle γ′1 in the area of the rectilinear portions 42, 44 of the minor cutting edges 30, 32.

Preferably, the rectilinear portions 42, 44 represent no more than 50% of the total length of the minor cutting edges 30, 32. A point at which the first rectilinear portion 42 of the first minor cutting edge 30 transitions to the first concavely curved portion 46 of the minor cutting edge 30 is indicated by reference numeral 80 in FIG. 4. A corresponding point at which the second rectilinear portion 44 of the second minor cutting edge 32 transitions to the second concavely curved portion 48 of the second minor cutting edge 32 is indicated by reference numeral 82 in FIG. 3. Preferably, these transition points 80, 82 have an equal distance from the main cutting edge 28. Preferably, the following applies to the distance: $0.1 \ l \leq a \leq 1 \ l$. Further preferably, the following applies to the distance: $r \leq a \leq 10 \ r$, wherein a is said distance, and r is the radius of the radii 38, 40.

The chip shaping geometry of the rake face 52 protrudes in the rear area 56 up to a height h above the cutting plane 50, wherein the following applies to this height: $0.6*l \geq h \geq 0.1*l$, wherein l indicates the length or width of the main cutting edge 28 including the radii 38, 40 (see FIG. 6).

Figure 4:
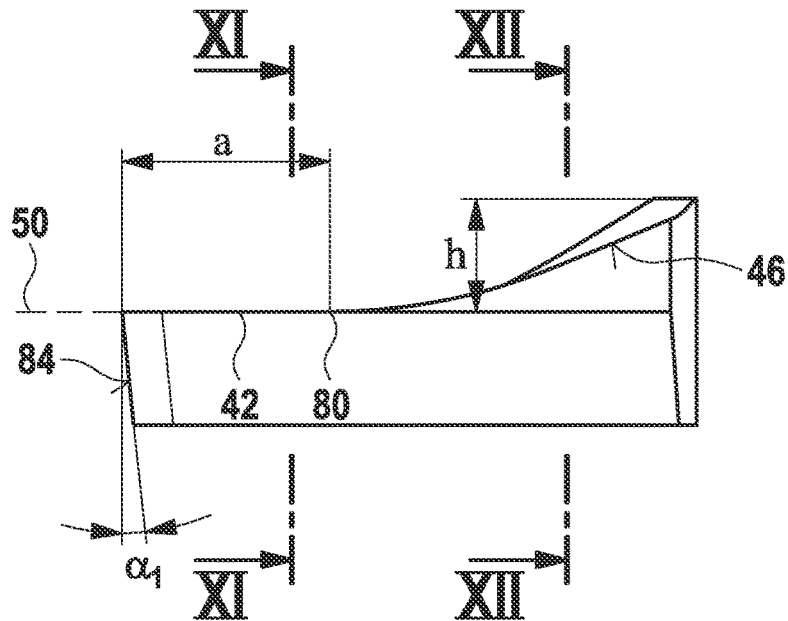
FIG. 4 a side view of the detail shown in FIG. 3.
Figure 6:
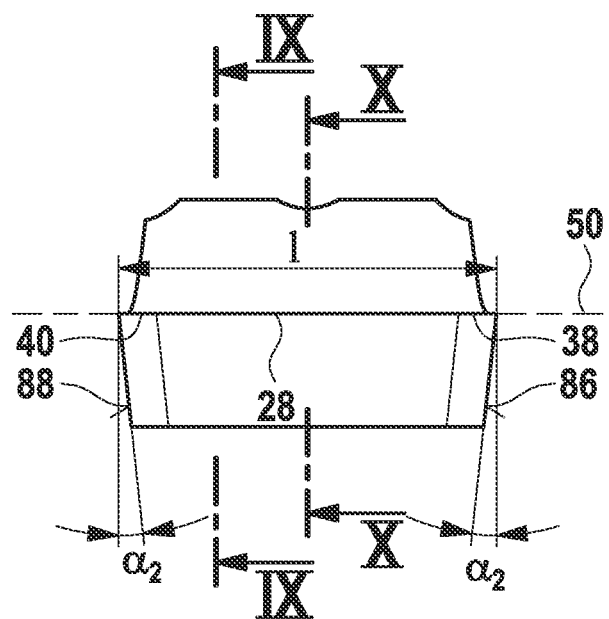
FIG. 6 a top view from the front of the detail of the cutting insert shown in FIG. 3.
Figure 7:
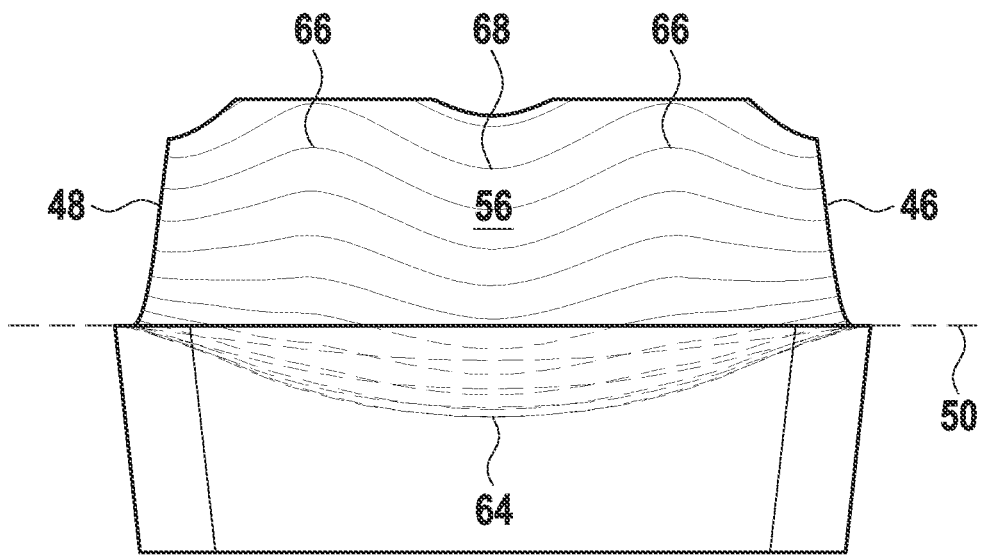
FIG. 7 a partially transparent top view of the detail shown in FIG. 3.

FIGS. 4 and 6 also show the front and side clearance angles of the cutting insert 10. The front clearance angle α1, which results at the front face 84 of the cutting insert 10, is preferably constant along the main cutting edge 28. For this front clearance angle α1, the following preferably applies: $4° \leq \alpha1 \leq 10°$, and the following particularly preferably applies: $5° \leq \alpha1 \leq 8°$. The lateral clearance angles α2, which result at the lateral flanks 86, 88 of the cutting insert 10, are also preferably constant along the entire minor cutting edges 30, 32. The following preferably applies to the lateral clearance angles α2: 4°≤α2≤10°, and the following particularly preferably applies: 5'≤α2≤8°.

The geometry of the cutting blade area of the cutting insert explained above and shown in the figures enables ideal chip formation and chip shaping, which is particularly suitable for grooving and parting-off turning of ductile materials. The cutting insert is particularly advantageous for grooving and parting-off turning of materials made of titanium or titanium alloys.

It should be noted that the present disclosure is not limited to the cutting insert design shown in the drawings. The design of the rake face, the main cutting edges and the minor cutting edges defined in the claims can in principle also be used for other types of cutting inserts, for example also for single-, triple- or multi-bladed cutting inserts.

What is claimed is:

1. A cutting insert for a tool for machining a workpiece, wherein the cutting insert comprises:
    a main cutting edge which is rectilinear and extends between a first end and an opposite second end;
    a first minor cutting edge which comprises a first rectilinear portion and a first concavely curved portion, wherein the first rectilinear portion is connected to the first end of the main cutting edge directly or via a radius or chamfer;
    a second minor cutting edge which comprises a second rectilinear portion and a second concavely curved portion, wherein the second rectilinear portion is connected to the second end of the main cutting edge directly or via a radius or chamfer; and
    a rake face which comprises a chip shaping geometry;
    wherein the main cutting edge, the first rectilinear portion and the second rectilinear portion are arranged in a common cutting plane,
    wherein the main cutting edge forms an acute angle with the first rectilinear portion and the second rectilinear portion, respectively,
    wherein the rake face is recessed downwardly with respect to the cutting plane in a front area of the rake face which is laterally bounded by the first rectilinear portion and the second rectilinear portion, and comprises a low point in each cross-section parallel to the main cutting edge, which low point has an equal first distance from the first rectilinear portion and the second rectilinear portion and has a maximum distance from the cutting plane compared to all other points on the rake face in the respective cross-section,
    wherein the chip shaping geometry is arranged at least in a rear area of the rake face, which is laterally bounded by the first concavely curved portion and the second concavely curved portion, and projects upwardly beyond the cutting plane and comprises at least two elevations so that the rake face in the rear area in a further cross-section parallel to the main cutting edge comprises two high points and an intermediate second low point which has an equal third distance from the first concavely curved portion and the second concavely curved portion, and
    wherein a rake angle varies along the main cutting edge such that a first rake angle at a center of the main cutting edge, which has an equal second distance from the first end and the second end of the main cutting edge, is greater than a second rake angle on a point of the main cutting edge that is closer to the first end or the second end than the center of the main cutting edge.

2. The cutting insert according to claim 1, wherein the rake angle varies along the main cutting edge such that the rake angle decreases monotonically from the center of the main cutting edge toward each of the first end and the second end.

3. The cutting insert according to claim 1, wherein:

$$5° \leq \gamma 2 < \gamma 1 \leq 30°,$$

wherein γ1 is the first rake angle and γ2 is the second rake angle.

4. The cutting insert according to claim 3, wherein:

$$0.8 \geq \frac{\gamma 2}{\gamma 1} \geq 0.16.$$

5. The cutting insert according to claim 1, wherein a minor cutting edge rake angle along the first minor cutting edge varies such that the minor cutting edge rake angle monotonically decreases along the first minor cutting edge with increasing distance from the main cutting edge.

6. The cutting insert according to claim 5, wherein the minor cutting edge rake angle is constant along the first rectilinear portion of the first minor cutting edge.

7. The cutting insert according to claim 1, wherein the rake face comprises a continuous free-form surface.

8. The cutting insert according to claim 1, wherein the rake face is mirror symmetrical to a mirror plane passing through the center of the main cutting edge and oriented orthogonally to the main cutting edge.

9. The cutting insert according to claim 1, wherein the rake face is directly adjacent to the main cutting edge, the first minor cutting edge, and the second minor cutting edge.

10. The cutting insert according to claim 1, wherein the rake face projects upwardly throughout the rear portion with respect to the cutting plane.

11. The cutting insert according to claim 1, wherein the chip shaping geometry projects to a height h above the cutting plane and the main cutting edge has a length l, wherein:

$$0.6*l \geq h \geq 0.1*l.$$

12. The cutting insert according to claim 1, wherein a curvature of the elevations increases with increasing distance from the main cutting edge.

13. The cutting insert according to claim 1, wherein a minor cutting edge distance between the first concavely curved portion and the second concavely curved portion decreases with increasing distance from the main cutting edge.

14. The cutting insert according to claim 1, wherein the rake face is concave in any longitudinal section orthogonal to the main cutting edge.

15. The cutting insert according to claim 1, wherein the first concavely curved portion is equal to or longer than the first rectilinear portion, and wherein the second concavely curved portion is equal to or longer than the second rectilinear portion.

16. A tool comprising a tool holder and a cutting insert, wherein the cutting insert comprises:
    a main cutting edge which is rectilinear and extends between a first end and an opposite second end;
    a first minor cutting edge which comprises a first rectilinear portion and a first concavely curved portion, wherein the first rectilinear portion is connected to the first end of the main cutting edge directly or via a radius or chamfer;

a second minor cutting edge which comprises a second rectilinear portion and a second concavely curved portion, wherein the second rectilinear portion is connected to the second end of the main cutting edge directly or via a radius or chamfer; and a rake face which comprises a chip shaping geometry;

wherein the main cutting edge, the first rectilinear portion and the second rectilinear portion are arranged in a common cutting plane, wherein the main cutting edge forms an acute angle with the first rectilinear portion and the second rectilinear portion, respectively, wherein the rake face is recessed downwardly with respect to the cutting plane in a front area of the rake face which is laterally bounded by the first rectilinear portion and the second rectilinear portion, and comprises a low point in each cross-section parallel to the main cutting edge, which low point has an equal first distance from the first rectilinear portion and the second rectilinear portion and has a maximum distance from the cutting plane compared to all other points on the rake face in the respective cross-section, wherein the chip shaping geometry is arranged at least in a rear area of the rake face, which is laterally bounded by the first concavely curved portion and the second concavely curved portion, and projects upwardly beyond the cutting plane and comprises at least two elevations so that the rake face in the rear area in a further cross-section parallel to the main cutting edge comprises two high points and an intermediate second low point which has an equal third distance from the first concavely curved portion and the second concavely curved portion, and wherein a rake angle varies along the main cutting edge such that a first rake angle at a center of the main cutting edge, which has an equal second distance from the first end and the second end of the main cutting edge, is greater than a second rake angle on a point of the main cutting edge that is closer to the first end or the second end than the center of the main cutting edge.

* * * * *